United States Patent
Ishida et al.

(10) Patent No.: US 11,289,727 B2
(45) Date of Patent: Mar. 29, 2022

(54) ELECTROCHEMICAL REACTION UNIT, ELECTROCHEMICAL REACTION CELL STACK, AND PRODUCTION METHOD FOR ELECTROCHEMICAL REACTION UNIT

(71) Applicant: MORIMURA SOFC TECHNOLOGY CO., LTD., Komaki (JP)

(72) Inventors: Satoru Ishida, Nagoya (JP); Tatsuya Ono, Nagoya (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 177 days.

(21) Appl. No.: 16/488,819

(22) PCT Filed: Jan. 31, 2018

(86) PCT No.: PCT/JP2018/003129
§ 371 (c)(1),
(2) Date: Aug. 26, 2019

(87) PCT Pub. No.: WO2018/155111
PCT Pub. Date: Aug. 30, 2018

(65) Prior Publication Data
US 2021/0135262 A1 May 6, 2021

(30) Foreign Application Priority Data
Feb. 27, 2017 (JP) .............................. JP2017-034322

(51) Int. Cl.
*H01M 8/0662* (2016.01)
*H01M 8/2432* (2016.01)
(Continued)

(52) U.S. Cl.
CPC ....... *H01M 8/0662* (2013.01); *H01M 8/0282* (2013.01); *H01M 8/12* (2013.01);
(Continued)

(58) Field of Classification Search
CPC ............ H01M 8/2432; H01M 8/0252; H01M 8/0258; H01M 8/12; H01M 2008/1293; H01M 8/0662; H01M 8/0282
See application file for complete search history.

(56) References Cited

U.S. PATENT DOCUMENTS 4,791,035 A * 12/1988 Reichner .............. H01M 8/243
429/456
5,292,599 A    3/1994 Soma et al.
(Continued)

FOREIGN PATENT DOCUMENTS

JP    02-242564 A    9/1990
JP    05-101836 A    4/1993
(Continued)

OTHER PUBLICATIONS

Machine Translation of JP2011169326A (Apr. 28, 2021) (Year: 2021).*
(Continued)

*Primary Examiner* — Matthew J Merkling
(74) *Attorney, Agent, or Firm* — Sughrue Mion, PLLC

(57) ABSTRACT

An electrochemical reaction unit including a unit cell including an electrolyte layer, and a cathode and an anode that face each other in a first direction with the electrolyte layer intervening therebetween; and a felt member containing a ceramic material or a metal and a silica component. The felt member includes both a first crystal structure and a second crystal structure, which is an $SiO_2$ crystal structure. Also disclosed is an electrochemical reaction cell stack including a plurality of electrochemical reaction units disposed in the first direction, at least one of the electrochemical reaction units being the above-described unit. Yet further disclosed is a method for producing the electrochemical reaction unit.

5 Claims, 10 Drawing Sheets

(51) Int. Cl.
*H01M 8/0282* (2016.01)
*H01M 8/12* (2016.01)
*H01M 8/242* (2016.01)
*H01M 8/124* (2016.01)

(52) U.S. Cl.
CPC ......... *H01M 8/242* (2013.01); *H01M 8/2432* (2016.02); *H01M 2008/1293* (2013.01)

(56) References Cited

U.S. PATENT DOCUMENTS

| | | | | |
|---|---|---|---|---|
| 5,856,035 | A * | 1/1999 | Khandkar | H01M 8/0232 429/443 |
| 2002/0024185 | A1 | 2/2002 | Ghosh et al. | |
| 2005/0266288 | A1 | 12/2005 | Zafred et al. | |
| 2007/0281194 | A1* | 12/2007 | Cortright | H01M 8/0273 429/434 |
| 2014/0170522 | A1 | 6/2014 | Hotta et al. | |
| 2015/0372319 | A1* | 12/2015 | Yagi | H01M 8/2483 429/465 |
| 2015/0372334 | A1* | 12/2015 | Yagi | H01M 8/0297 429/465 |
| 2015/0380744 | A1* | 12/2015 | Komatsu | H01M 8/0297 429/444 |
| 2017/0294673 | A1* | 10/2017 | Morikawa | H01M 4/9066 |

FOREIGN PATENT DOCUMENTS

| | | | |
|---|---|---|---|
| JP | 5-166529 | A | 7/1993 |
| JP | 06-036783 | A | 2/1994 |
| JP | 06-223849 | A | 8/1994 |
| JP | 2005-166455 | A | 6/2005 |
| JP | 2007-141765 | A | 6/2007 |
| JP | 2009-043550 | A | 2/2009 |
| JP | 2011-169326 | A | 9/2011 |
| JP | 2015-090788 | A | 5/2015 |
| KR | 10-2014-0044898 | A | 4/2014 |

OTHER PUBLICATIONS

International Search Report (PCT/ISA/210), issued by International Searching Authority in corresponding International Application No. PCT/JP2018/003219, dated Mar. 13, 2018.

Communication dated Dec. 11, 2020 issued by the European Patent Office in European Application No. 18757019.7.

Communication dated Oct. 20, 2020, issued by the Korean Intellectual Property Office in corresponding Korean Application No. 10-2019-7024925.

Office Action dated Nov. 18, 2021 by the State Intellectual Property Office of P.R. China in Machine corresponding Chinese Patent Application No. 201880014234.8.

* cited by examiner

| SAMPLE No. | Al$_2$O$_3$ CRYSTAL PEAK | THERMAL TREATMENT AT 1,000°C | SiO$_2$ CRYSTAL PEAK | SiO$_2$/Al$_2$O$_3$ CRYSTAL PEAK INTENSITY RATIO | Si SCATTERING TEST | | DURABILITY TEST | | |
|---|---|---|---|---|---|---|---|---|---|
| | | | | | AMOUNT OF Si (ppm) | RATING | Δη (Ω) | AMOUNT OF Si POISONING AT ANODE (ppm) | RATING |
| S1 | PRESENCE | PRESENCE | PRESENCE | 0.61 | NOT DETECTED | ○ | 0.06 | 200 | ○ |
| S2 | PRESENCE | ABSENCE | ABSENCE | 0.00 | 180 | × | — | — | — |
| S3 | ABSENCE | PRESENCE | PRESENCE | ∞ | 250 | × | — | — | — |
| S4 | ABSENCE | ABSENCE | ABSENCE | 0.00 | 250 | × | 0.12 | 850 | × |

FIG. 9

ELECTROCHEMICAL REACTION UNIT, ELECTROCHEMICAL REACTION CELL STACK, AND PRODUCTION METHOD FOR ELECTROCHEMICAL REACTION UNIT

TECHNICAL FIELD

The technique disclosed in the present specification relates to an electrochemical reaction unit.

BACKGROUND ART

One known type of a fuel cell for generating electricity by utilizing electrochemical reaction between hydrogen and oxygen is a solid oxide fuel cell (hereinafter may be referred to as "SOFC"). A fuel cell electricity generation unit (hereinafter may be referred to as "electricity generation unit"), which is a constitutive unit of an SOFC, includes a fuel cell unit cell (hereinafter may be referred to as "unit cell"). The unit cell includes an electrolyte layer, a cathode, and an anode such that the cathode and the anode face each other in a predetermined direction (hereinafter referred to as a "first direction") and the electrolyte layer intervenes between these electrodes.

The electricity generation unit may include a felt member for, for example, filling a space surrounding the unit cell to thereby improve electricity generation performance. Such a felt member is required to have flexibility and thermal resistance. Thus, the felt member is formed of, for example, a metal-containing felt material (e.g., nickel felt) or a ceramic-containing felt material (e.g., alumina felt) (see, for example, Patent Document 1).

PRIOR ART DOCUMENT

Patent Document

Patent Document 1: Japanese Patent Application Laid-Open (kokai) No. H05-166529

SUMMARY OF THE INVENTION

Problem to be Solved by the Invention

Such a ceramic-containing felt material or metal-containing felt material may contain a contaminant such as Si. Thus, in the aforementioned conventional configuration, the performance of the unit cell may be impaired due to poisoning caused by a contaminant (e.g., Si) scattered from the felt member.

Such a problem is common with an electrolysis cell unit, which is a constitutive unit of a solid oxide electrolysis cell (hereinafter may be referred to as "SOEC") for generating hydrogen by utilizing the electrolysis of water. In the present specification, a fuel cell electricity generation unit and an electrolysis cell unit are collectively referred to as an "electrochemical reaction unit." Such a problem is also common with electrochemical reaction units other than SOFC and SOEC.

The present specification discloses a technique capable of solving the aforementioned problems.

Means for Solving the Problem

The technique disclosed in the present specification can be implemented in, for example, the following modes.

(1) The electrochemical reaction unit disclosed in the present specification includes:

a unit cell including an electrolyte layer, and a cathode and an anode that face each other in a first direction with the electrolyte layer intervening therebetween; and a felt member containing a ceramic material or a metal and a silica component, the electrochemical reaction unit being characterized in that:

the felt member includes both a first crystal structure and a second crystal structure, which is an $SiO_2$ crystal structure. According to this electrochemical reaction unit, since the felt member includes both a first crystal structure and a second crystal structure (i.e., an $SiO_2$ crystal structure), scattering of Si or another contaminant from the felt member can be reduced, to thereby prevent impairment of the performance of the unit cell, which would otherwise occur due to poisoning caused by Si or another contaminant.

(2) In the above electrochemical reaction unit, the felt member may be disposed in a gas chamber facing a specific electrode, which is at least one of the cathode and the anode. According to this electrochemical reaction unit, the felt member is disposed in the gas chamber facing the specific electrode. Thus, although the electrochemical reaction unit has such a configuration that the performance of the unit cell would be readily impaired due to poisoning caused by Si or another contaminant scattered from the felt member, scattering of Si or another contaminant from the felt member can be reduced, to thereby prevent impairment of the performance of the unit cell, which would otherwise occur due to poisoning caused by Si or another contaminant.

(3) In the above electrochemical reaction unit, the felt member may be disposed in the gas chamber facing the specific electrode to be located at opposite ends of the gas chamber in a direction orthogonal to a main flow direction of a gas. According to this electrochemical reaction unit, the presence of the felt member prevents discharge of a gas from the gas chamber facing the specific electrode through a region that less contributes to reaction, the gas having been supplied to the gas chamber, to thereby improve reaction performance. In addition, scattering of Si or another contaminant from the felt member can be reduced, to thereby prevent impairment of the performance of the unit cell, which would otherwise occur due to poisoning caused by Si or another contaminant.

(4) The above electrochemical reaction unit may further include:

a frame member having a hole forming the gas chamber facing the specific electrode; and a current collecting member electrically connected to the specific electrode, wherein:

the felt member is disposed between an outer surface of the current collecting member and a wall surface of the hole of the frame member in a direction orthogonal to the first direction. According to this electrochemical reaction unit, the presence of the felt member prevents discharge of a gas from the gas chamber facing the specific electrode through a region that less contributes to reaction, the gas having been supplied to the gas chamber, to thereby improve reaction performance. In addition, scattering of Si or another contaminant from the felt member can be reduced, to thereby prevent impairment of the performance of the unit cell, which would otherwise occur due to poisoning caused by Si or another contaminant.

(5) In the above electrochemical reaction unit, the felt member may contain alumina as the ceramic material. According to this electrochemical reaction unit, the thermal resistance and flexibility of the felt member can be improved while reducing scattering of Si or another contaminant from the felt member.

(6) In the above electrochemical reaction unit, the electrochemical reaction unit may be a fuel cell electricity generation unit. According to this electrochemical reaction unit, impairment of the electricity generation performance of the unit cell, which would otherwise occur due to poisoning caused by Si or another contaminant, can be prevented.

(7) The method disclosed in the specification for producing an electrochemical reaction unit including a unit cell including an electrolyte layer, and a cathode and an anode that face each other in a first direction with the electrolyte layer intervening therebetween, and a felt member containing a ceramic material or a metal and a silica component, the method being characterized by including the steps of:

providing a felt raw material containing a ceramic material or a metal and a silica component; and thermally treating the felt raw material at 1,000° C. or higher, thereby forming the felt member. According to the electrochemical reaction unit production method, since the felt member is formed through thermal treatment of the felt raw material at 1,000° C. or higher, the felt member includes both a first crystal structure and a second crystal structure (i.e., an $SiO_2$ crystal structure), and thus scattering of Si or another contaminant from the felt member can be reduced. Therefore, impairment of the performance of the unit cell, which would otherwise occur due to poisoning caused by Si or another contaminant, is less likely to occur in the resultant electrochemical reaction unit.

The technique disclosed in the present specification may be implemented in various modes; for example, an electrochemical reaction unit (fuel cell electricity generation unit or electrolysis cell unit), an electrochemical reaction cell stack (fuel cell stack or electrolysis cell stack) including a plurality of electrochemical reaction units, and a production method therefor.

BRIEF DESCRIPTION OF THE DRAWINGS

FIG. 9 Explanatory table showing the results of performance evaluation.

MODES FOR CARRYING OUT THE INVENTION

A. Embodiment

A-1. Device Structure
(Structure of Fuel Cell Stack 100)

Figure 1:
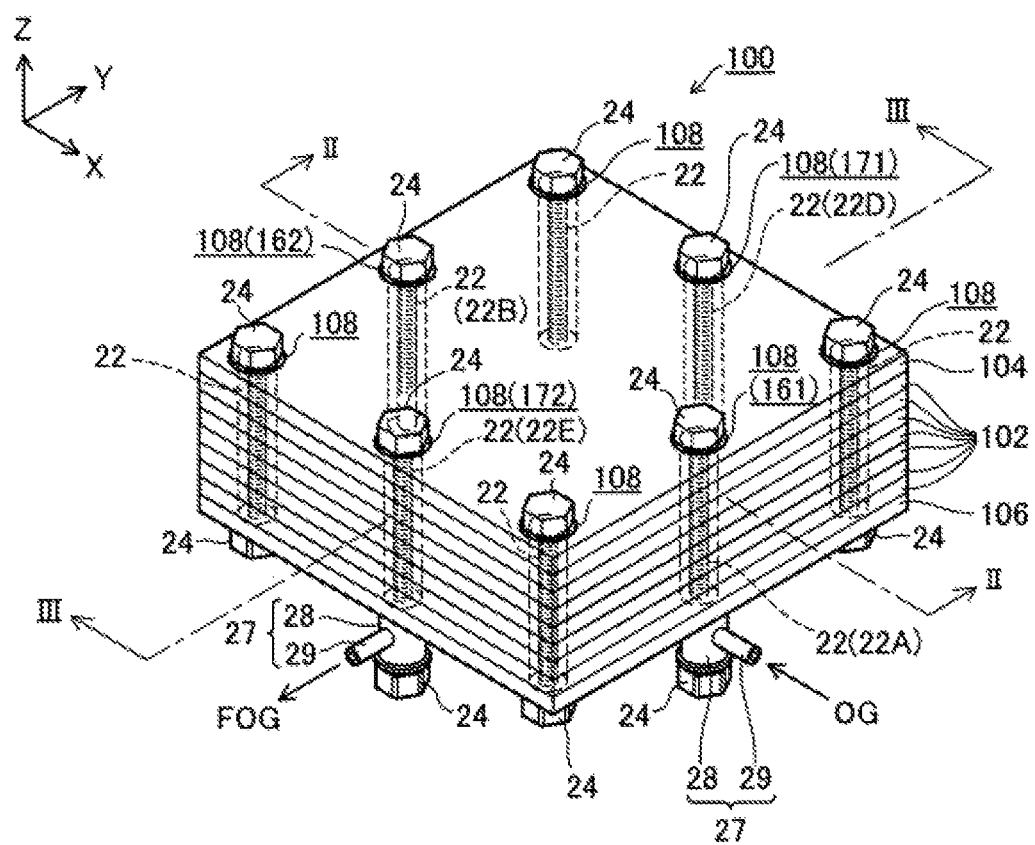
FIG. 1 Perspective view showing the external appearance of a fuel cell stack 100 according to an embodiment.
Figure 2:
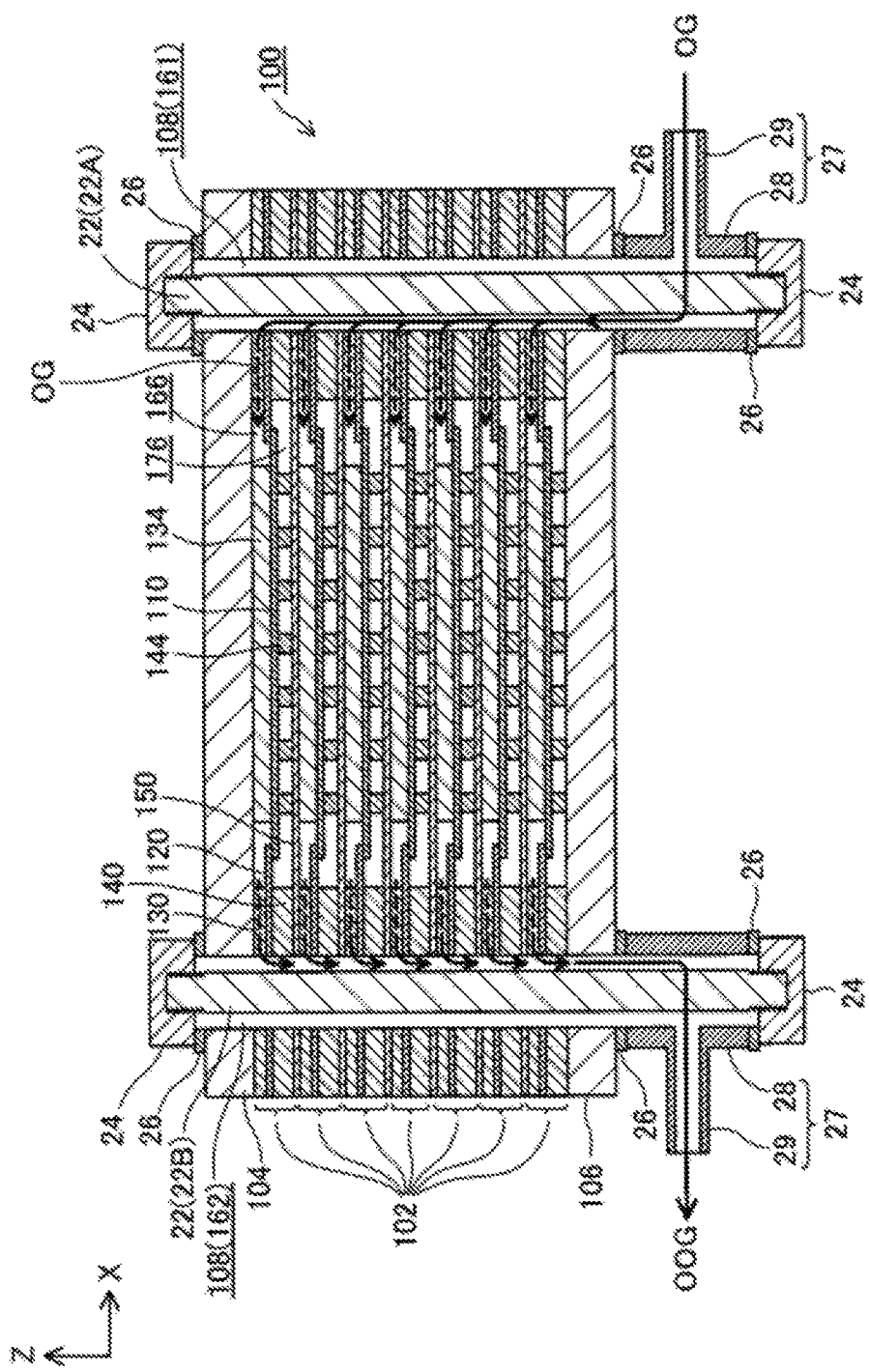
FIG. 2 Explanatory view showing an XZ section of the fuel cell stack 100 taken along line II-II of FIG. 1.
Figure 3:
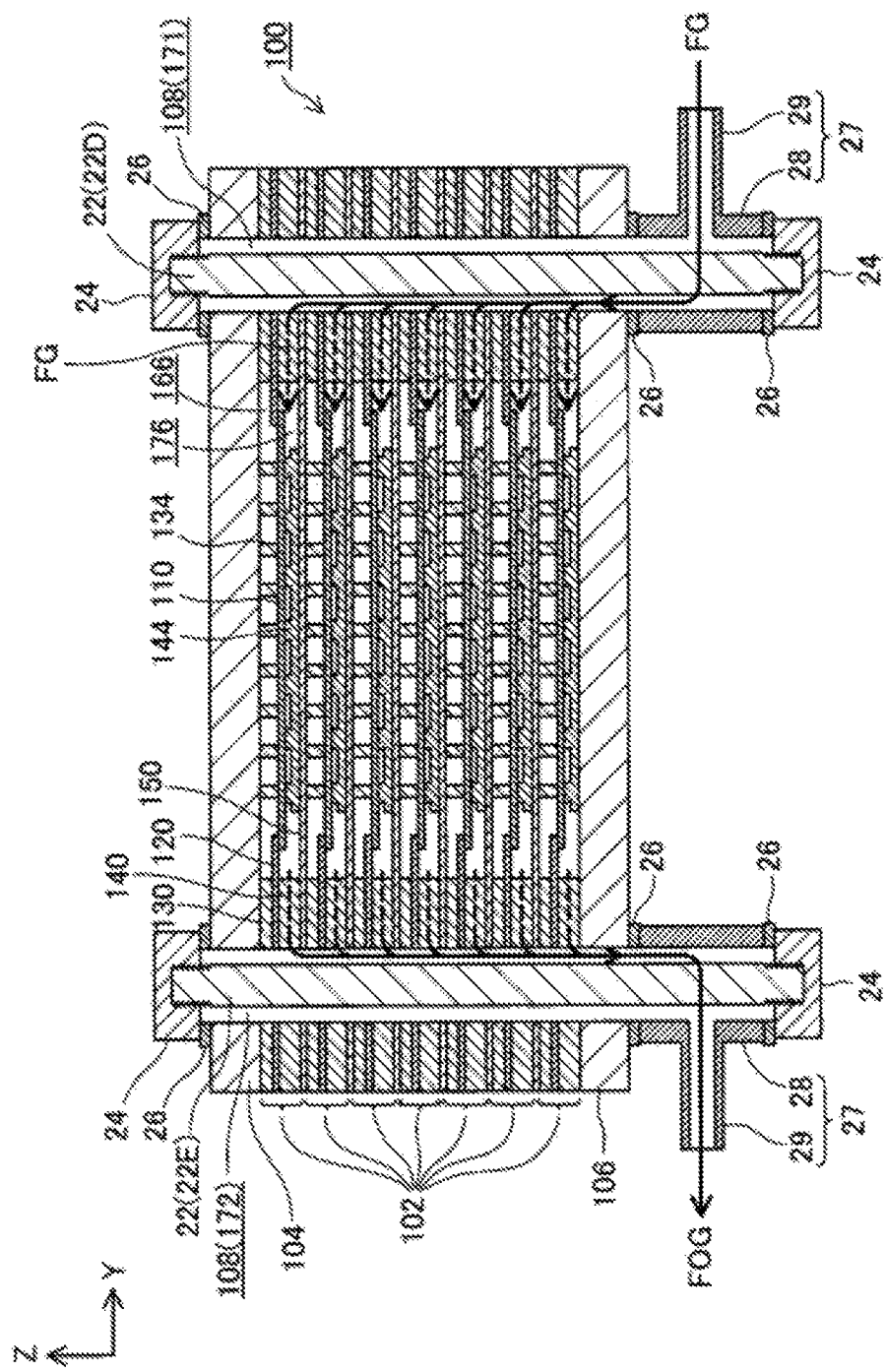
FIG. 3 Explanatory view showing a YZ section of the fuel cell stack 100 taken along line III-III of FIG. 1.

FIG. 1 is a perspective view showing the external appearance of a fuel cell stack 100 according to the present embodiment; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying respective directions. In the present specification, for the sake of convenience, the positive Z-axis direction is called the "upward direction" and the negative Z-axis direction is called the "downward direction"; however, in actuality, the fuel cell stack 100 may be disposed in a different orientation. The same also applies to FIG. 4 and subsequent drawings.

The fuel cell stack 100 includes a plurality of (seven in the present embodiment) of fuel cell electricity generation units (hereinafter may be referred to simply as "electricity generation units") 102 and a pair of end plates 104 and 106. The seven electricity generation units 102 are disposed in a predetermined direction of array (in the vertical direction in the present embodiment). A pair of the end plates 104 and 106 is disposed in such a manner as to hold an assembly of the seven electricity generation units 102 from the upper and lower sides thereof. The direction of array (vertical direction) corresponds to the first direction appearing in CLAIMS.

The fuel cell stack 100 has a plurality (eight in the present embodiment) of holes extending in the vertical direction through peripheral portions about the Z-axis direction of its component layers (the electricity generation units 102 and the end plates 104 and 106). The corresponding holes formed in the layers communicate with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 may be referred to as the "communication holes 108."

Bolts 22 extending in the vertical direction are inserted into the corresponding communication holes 108, and the fuel cell stack 100 is fastened by means of the bolts 22 and nuts 24 engaged with opposite ends of the bolts 22. As shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as a fuel gas introduction manifold 171 into which fuel gas FG is introduced from outside the fuel cell stack 100 and which supplies the fuel gas FG to the electricity generation units 102, whereas a space defined by the bolt 22 (bolt 22E) located at around the midpoint of the other side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
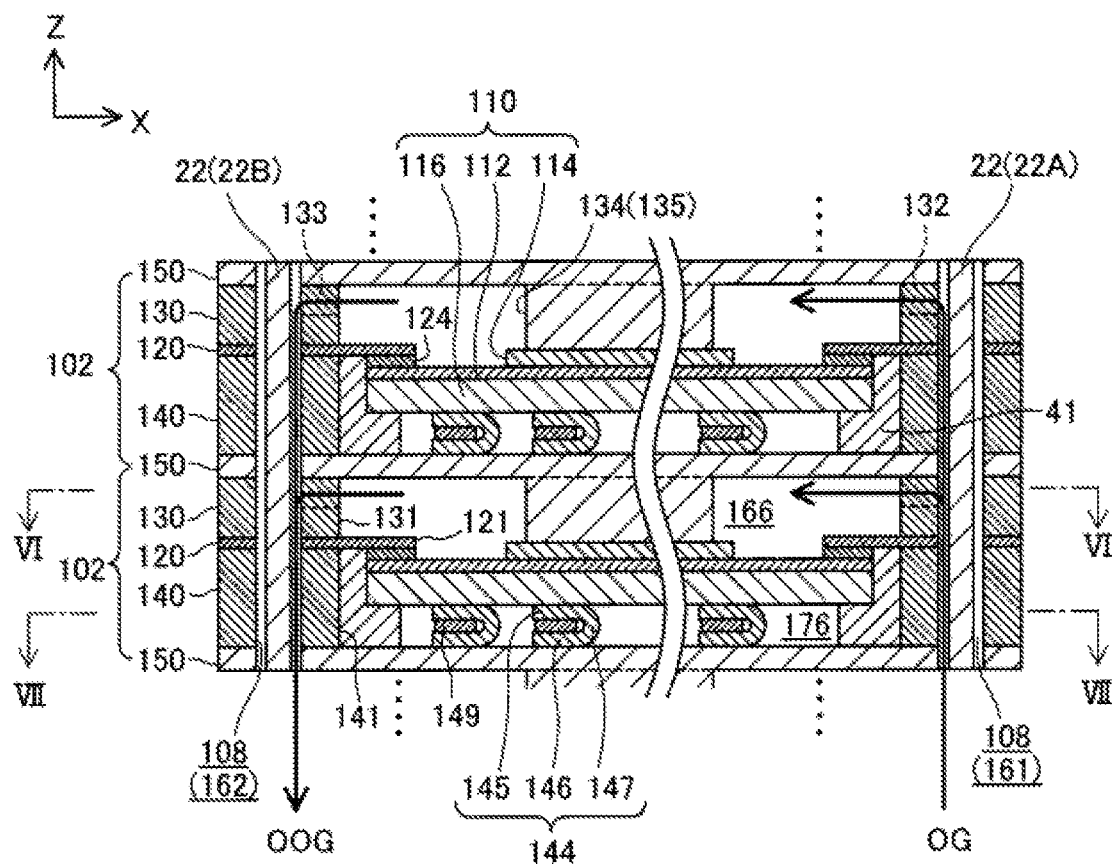
FIG. 4 Explanatory view showing an XZ section of two adjacent electricity generation units 102 at the same position as that of FIG. 2.
Figure 5:
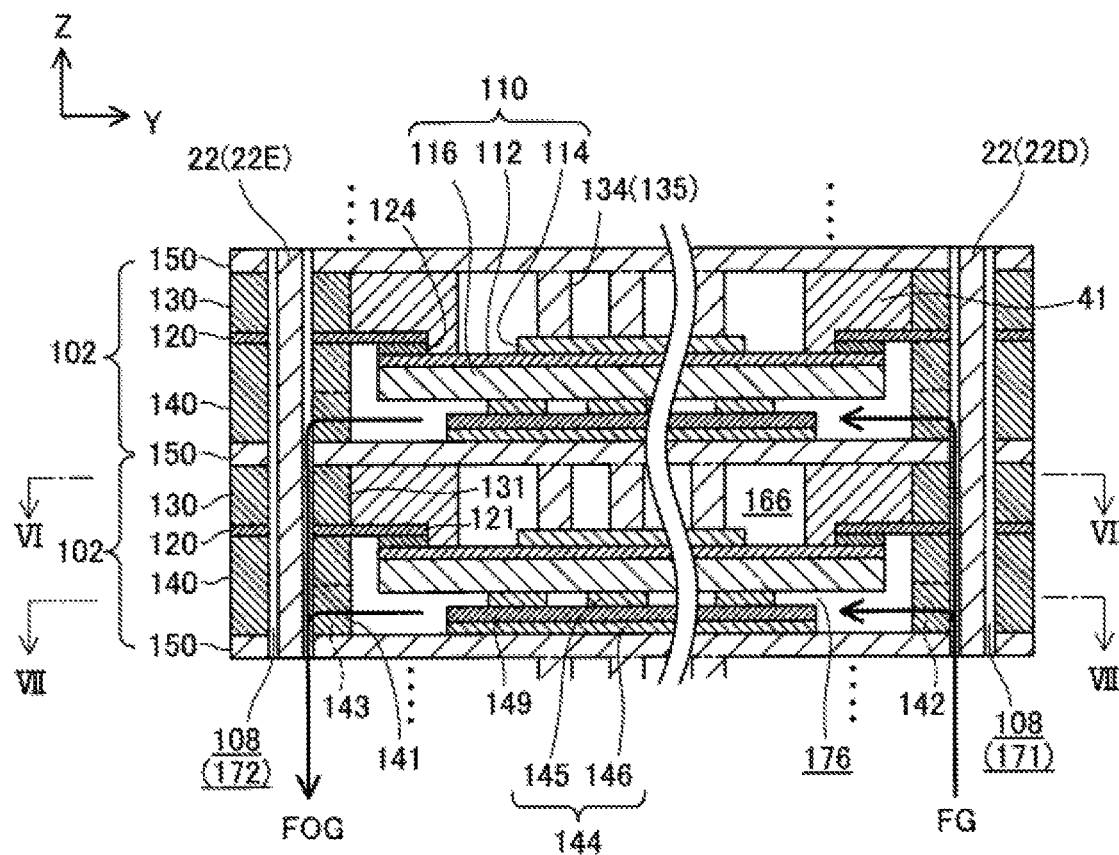
FIG. 5 Explanatory view showing a YZ section of two adjacent electricity generation units 102 at the same position as that of FIG. 3.
Figure 6:
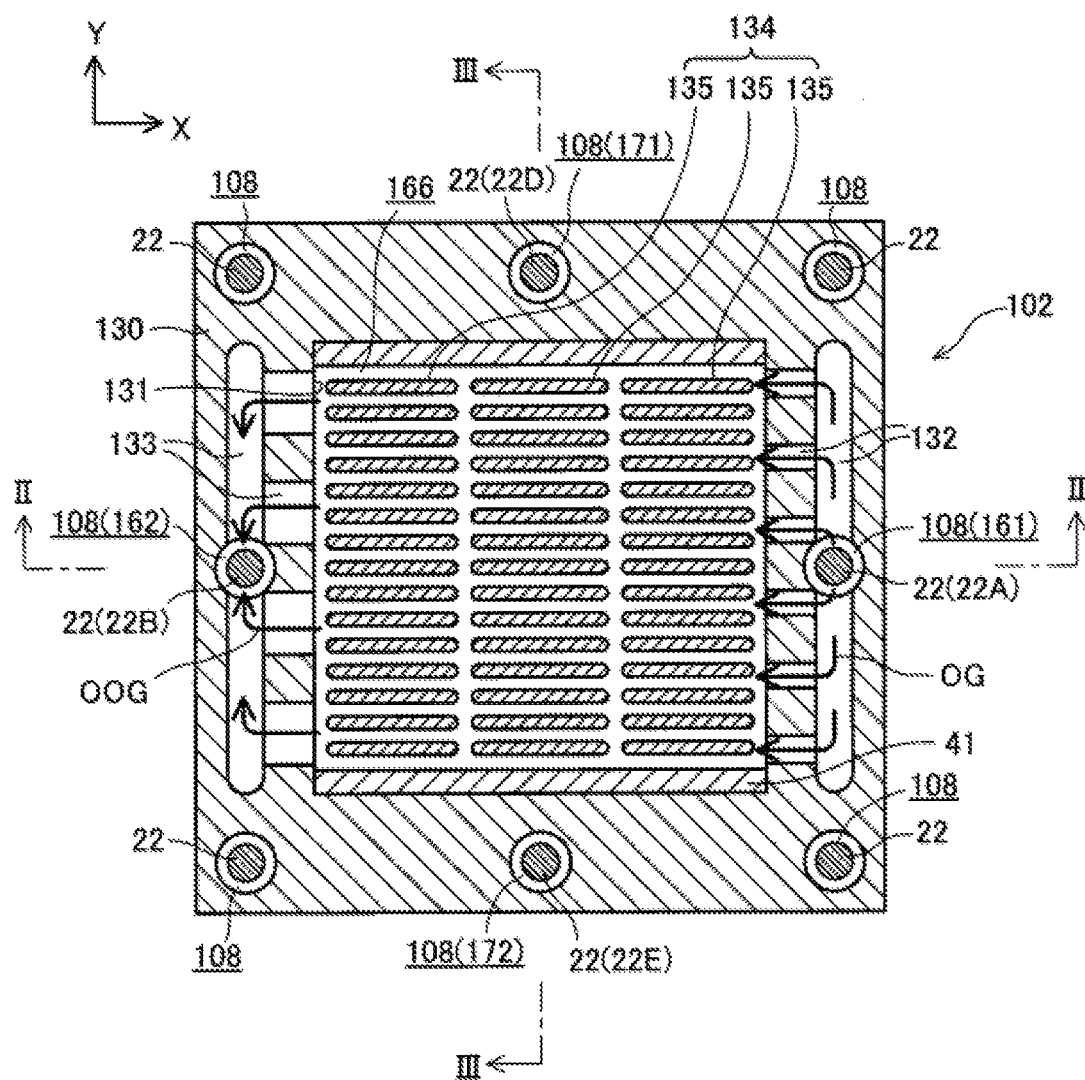
FIG. 6 Explanatory view showing an XY section of the electricity generation unit 102 taken along line VI-VI of FIGS. 4 and 5.
Figure 7:
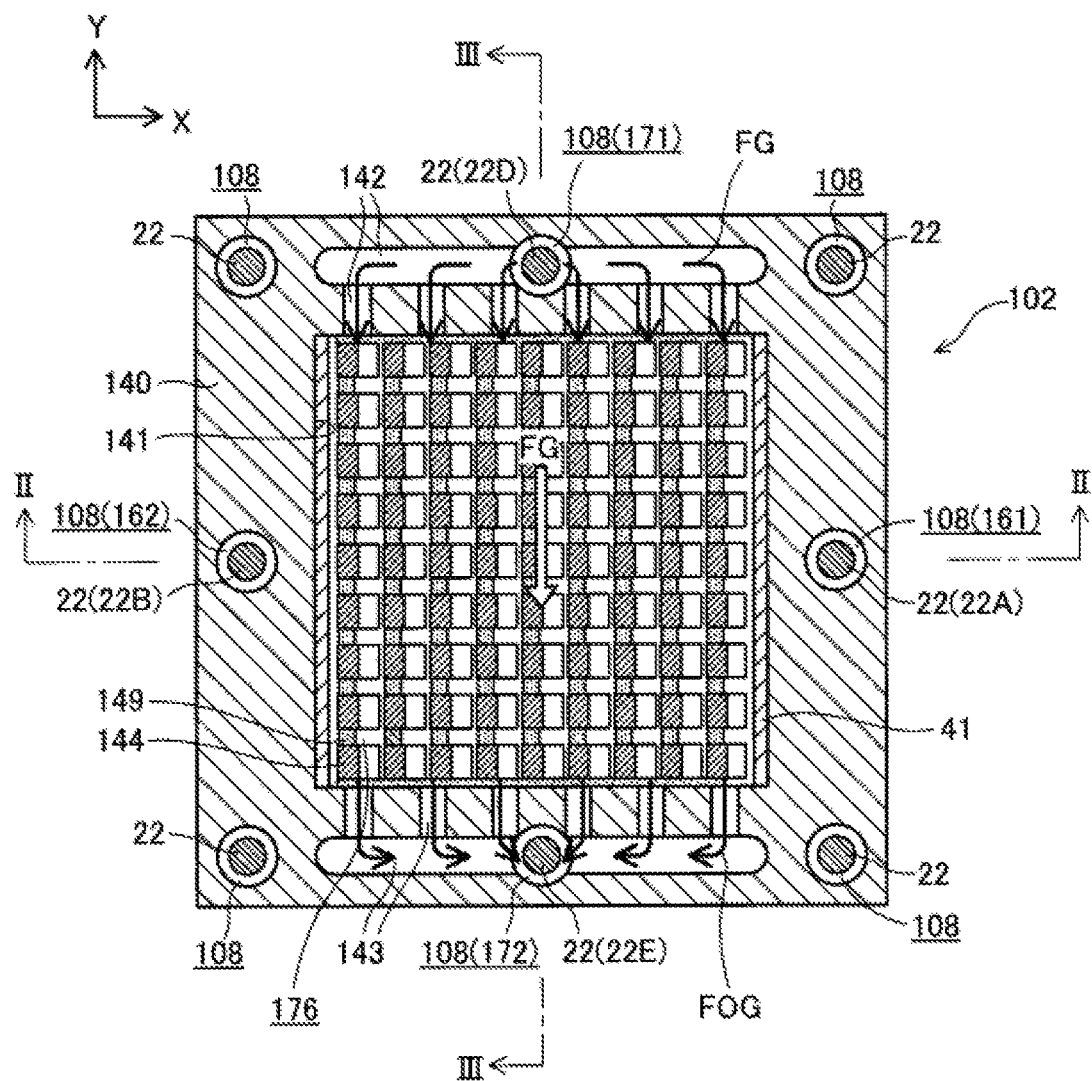
FIG. 7 Explanatory view showing an XY section of the electricity generation unit 102 taken along line VII-VII of FIGS. 4 and 5.

FIG. 4 is an explanatory view showing an XZ section of two adjacent electricity generation units 102 at the same position as that of FIG. 2, and FIG. 5 is an explanatory view showing a YZ section of two adjacent electricity generation units 102 at the same position as that of FIG. 3. FIG. 6 is an explanatory view showing an XY section of the electricity generation unit 102 taken along line VI-VI of FIGS. 4 and 5, and FIG. 7 is an explanatory view showing an XY section of the electricity generation unit 102 taken along line VII-VII of FIGS. 4 and 5.

As shown in FIGS. 4 and 5, the electricity generation unit 102 includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150.

The interconnector 150 is an electrically conductive member having an approximately rectangular flat plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3).

The unit cell 110 includes an electrolyte layer 112, a cathode 114 and an anode 116 that face each other in the vertical direction (in the direction of array of the electricity generation units 102) with the electrolyte layer 112 intervening therebetween. The unit cell 110 of the present embodiment is an anode-support-type unit cell in which the anode 116 supports the electrolyte layer 112 and the cathode 114.

The electrolyte layer 112 is a member having an approximately rectangular (as viewed in the Z-axis direction) flat-plate shape and is a dense layer (having low porosity). The electrolyte layer 112 is formed of a solid oxide, such as YSZ (yttria-stabilized zirconia), ScSZ (scandia-stabilized zirconia), SDC (samarium-doped ceria), GDC (gadolinium-doped ceria), or a perovskite-type oxide. The cathode 114 is a member having an approximately rectangular flat-plate shape and having a size smaller than that of the electrolyte layer 112 (as viewed in the Z-axis direction), and is a porous layer (having a porosity higher than that of the electrolyte layer 112). The cathode 114 is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having an approximately rectangular flat-plate shape and having a size approximately equal to that of the electrolyte layer 112 (as viewed in the Z-axis direction), and is a porous layer (having a porosity higher than that of the electrolyte layer 112). The anode 116 is formed of, for example, Ni (nickel), a cermet of Ni and ceramic particles, or an Ni-based alloy. Thus, the unit cell 110 (electricity generation unit 102) according to the present embodiment is a solid oxide fuel cell (SOFC) containing a solid oxide as an electrolyte.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface of the electrolyte layer 112 on the cathode 114 side. The separator 120 is bonded to the electrolyte layer 112 (unit cell 110) by means of a bonding layer 124 formed of a brazing material (e.g., Ag brazing material) and disposed between the facing portion of the separator 120 and the electrolyte layer 112. The separator 120 separates the cathode chamber 166 which faces the cathode 114, and the anode chamber 176 which faces the anode 116, from each other, thereby preventing gas leakage from one electrode side to the other electrode side at a peripheral portion of the unit cell 110.

As shown in FIG. 6, the cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface of the separator 120 on the side opposite the electrolyte layer 112 and with a peripheral portion of the surface of the interconnector 150 on the side toward the cathode 114. The cathode-side frame 130 electrically insulates the two interconnectors 150 included in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162.

As shown in FIG. 7, the anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface of the separator 120 on the side toward the electrolyte layer 112 and with a peripheral portion of the surface of the interconnector 150 on the side toward the anode 116. Also, the anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

The cathode-side current collector 134 is disposed within the cathode chamber 166. The cathode-side current collector 134 is composed of a plurality of current collector elements 135 each having an approximately rectangular columnar shape and is formed of, for example, ferritic stainless steel. The cathode-side current collector 134 is in contact with the surface of the cathode 114 on the side opposite the electrolyte layer 112 and with the surface of the interconnector 150 on the side toward the cathode 114. As described above, since the electricity generation unit 102 disposed at the uppermost position in the fuel cell stack 100 does not have the upper interconnector 150, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. In the present embodiment, the cathode-side current collector 134 and the interconnector 150 are integrally formed as a unitary member. Specifically, in the unitary member, a portion having a flat-plate shape orthogonal to the vertical direction (Z-axis direction) functions as the interconnector 150, and the current collector elements 135 protruding from the flat-plate-shape portion toward the cathode 114 function as the cathode-side current collector 134. The unitary member formed of the cathode-side current collector 134 and the interconnector 150 may be covered with an electrically conductive coating. An electrically conductive bonding layer may be disposed between the cathode 114 and the cathode-side current collector 134 for bonding therebetween.

The anode-side current collector 144 is disposed within the anode chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface of the anode 116 on the side opposite the electrolyte layer 112, and the interconnector facing portion 146 is in contact with the surface of the interconnector 150 on the side toward the anode 116. As described above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. A spacer 149 formed of, for example, mica is disposed between the electrode facing portion 145 and the interconnector facing portion 146. Thus, the anode-side current collector 144 follows the deformation of the electricity generation unit 102 stemming from a temperature cycle and a pressure variation of reaction gas, thereby maintaining good electrical connection between the anode 116 and the interconnector 150 (or the end plate 106) via the anode-side current collector 144.

In the present embodiment, each electricity generation unit 102 includes a felt member 41. As shown in FIGS. 4 and 6, the felt member 41 is disposed in the cathode chamber 166 at oppoiste ends in the direction (Y-axis direction) orthogonal to the main flow direction (X-axis direction) of the oxidizer gas OG (i.e., at a position not overlapping with the cathode 114 of the unit cell 110 in the Z-axis direction). Specifically, the felt member 41 is disposed between the outer surface of the cathode-side current collector 134 and the wall surface of the hole 131 of the cathode-side frame 130 in the direction (Y-axis direction) orthogonal to the Z-axis direction. As shown in FIGS. 5 and 7, the felt member 41 is also disposed in the anode chamber 176 at opposite ends in the direction (X-axis direction) orthogonal to the main flow direction (Y-axis direction) of the fuel gas FG (i.e., at a position not overlapping with the cathode 114 of the unit cell 110 in the Z-axis direction). Specifically, the felt member 41 is disposed between the outer surface of the anode-side current collector 144 and the wall surface of the hole 141 of the anode-side frame 140 in the direction (X-axis direction) orthogonal to the Z-axis direction. The presence of the felt member 41 prevents discharge of the oxidizer gas OG (supplied to the cathode chamber 166) or the fuel gas FG (supplied to the anode chamber 176) from the cathode chamber 166 or the anode chamber 176 through a region that less contributes to electricity generation, to thereby improve electricity generation performance. The cathode 114 or the anode 116 in the present embodiment corresponds to the specific electrode appearing in CLAIMS. The cathode-side frame 130 or the anode-side frame 140 in the present embodiment corresponds to the frame member appearing in CLAIMS. The cathode-side current collector 134 or the anode-side current collector 144 in the present embodiment corresponds to the current collecting member appearing in CLAIMS.

The felt member 41 is formed of an alumina-silica (silicon dioxide) felt material. That is, the felt member 41 contains alumina (ceramic material) and a silica component. Since the felt member 41 contains alumina, the felt member 41 exhibits improved thermal resistance and flexibility. The felt member 41 used in the present embodiment includes both an $Al_2O_3$ crystal structure and an $SiO_2$ crystal structure. The $Al_2O_3$ crystal structure corresponds to the first crystal structure appearing in CLAIMS, and the $SiO_2$ crystal structure corresponds to the second crystal structure appearing in CLAIMS.

A-2. Operation of Fuel Cell Stack 100

As shown in FIGS. 2, 4, and 6, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the cathode chambers 166 through the oxidizer gas supply communication holes 132 of the electricity generation units 102. Also, as shown in FIGS. 3, 5, and 7, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the unit cell 110 generates electricity through the electrochemical reaction between oxygen contained in the oxidizer gas OG and hydrogen contained in the fuel gas FG. The electricity generating reaction is an exothermic reaction. In each electricity generation unit 102, the cathode 114 of the unit cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. In the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2, 4, and 6, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3, 5, and 7, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

A-3. Production Method for Fuel Cell Stack 100

Figure 8:
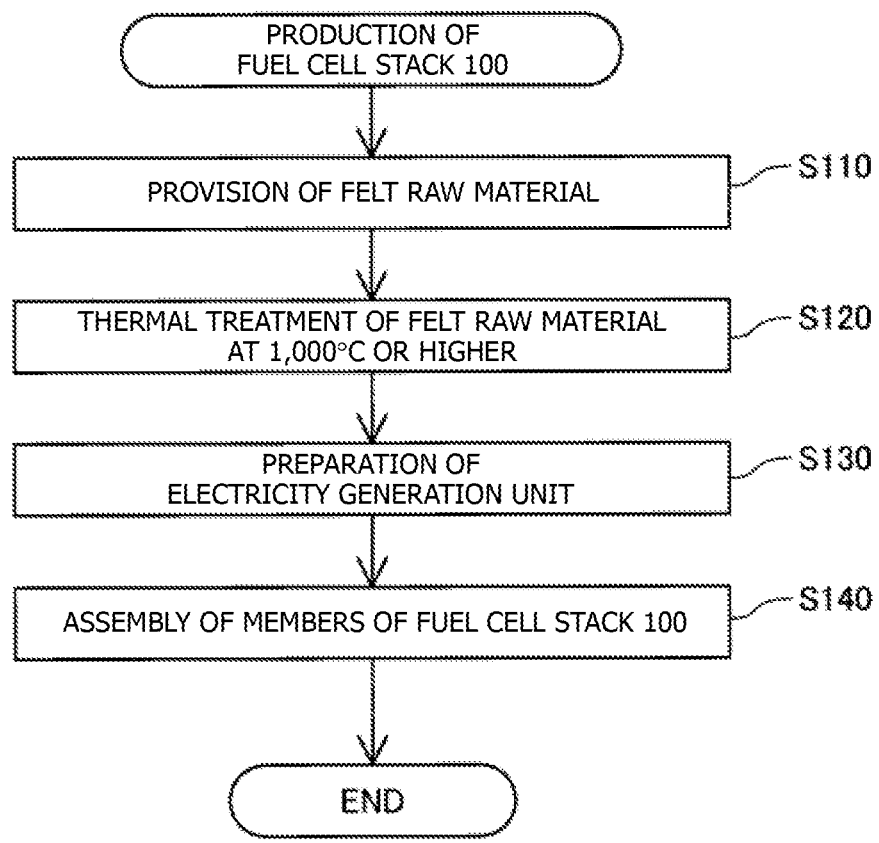
FIG. 8 Flowchart showing a production method for the fuel cell stack 100.

Next will be described a production method for the fuel cell stack 100. FIG. 8 is a flowchart showing a production method for the fuel cell stack 100. Firstly, a felt raw material is provided (S110). The felt raw material used is a commercially available alumina-silica felt raw material having an $Al_2O_3$ crystal structure. The alumina-silica felt raw material contains both alumina and amorphous silica (i.e., silica component).

Subsequently, the felt raw material is thermally treated at 1,000° C. or higher and then formed into the felt member 41 (S120). The thermal treatment temperature may be, for example, 1,300° C. or lower. The thermal treatment period may be, for example, 8 to 12 hours. When the felt raw material is thermally treated at 1,000° C. or higher, amorphous silica (i.e., silica component) contained in the felt raw material is converted into crystalline silica. Thus, the resultant felt member 41 includes both an $Al_2O_3$ crystal structure and an $SiO_2$ crystal structure.

Subsequently, the electricity generation unit 102 is prepared by a known method (S130). In this step, as described above, the felt member 41 formed in S120 is disposed at a predetermined position in the cathode chamber 166 and the anode chamber 176.

Finally, a plurality of electricity generation units 102 are arranged in a predetermined direction of array (in the vertical direction), and the members of the electricity generation units are assembled into the fuel cell stack 100 (S140). The production of the fuel cell stack 100 having the aforementioned configuration is completed through the above steps.

A-4. Performance Evaluation

Figure 10:
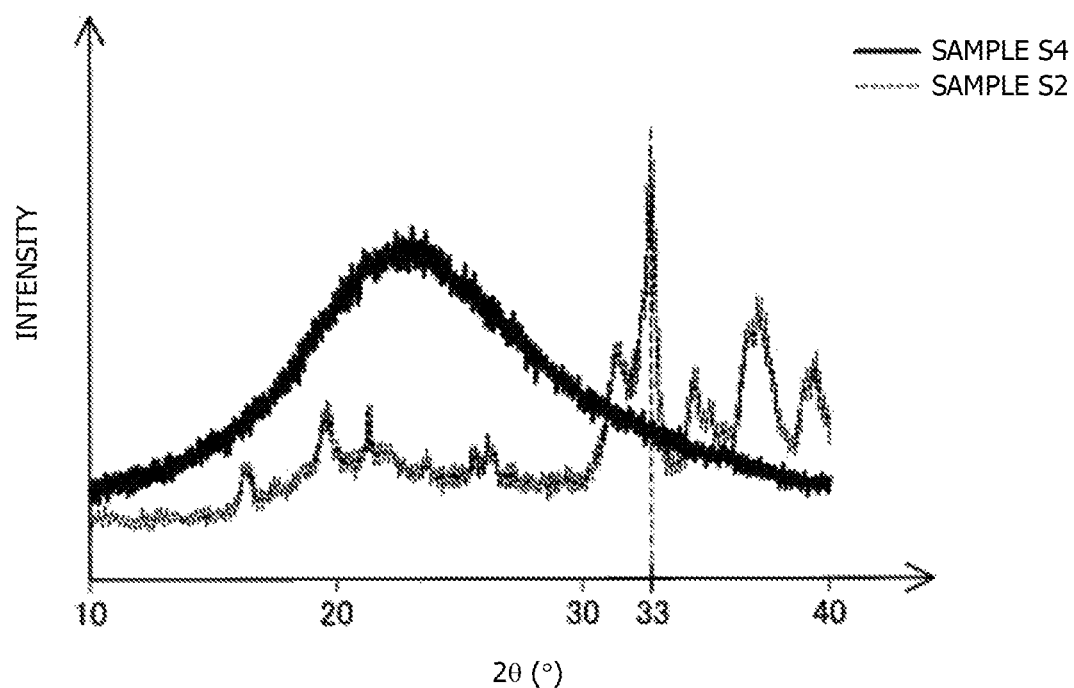
FIG. 10 Explanatory graph showing the results of XRD analysis of samples used for performance evaluation.
Figure 11:
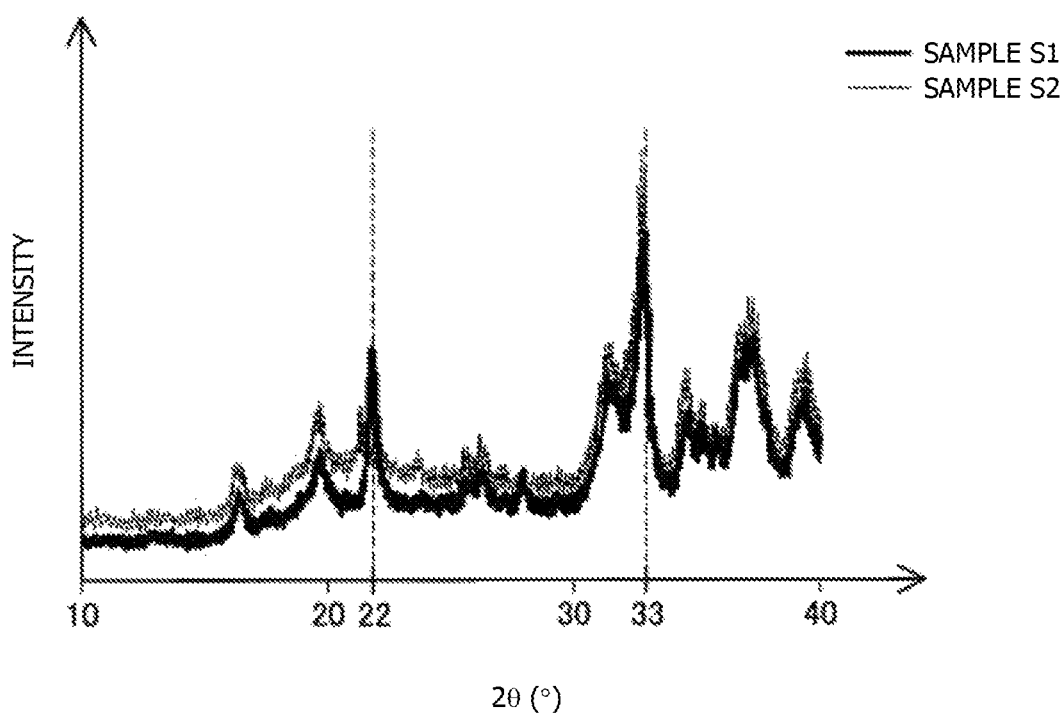
FIG. 11 Explanatory graph showing the results of XRD analysis of samples used for performance evaluation.

Next will be described the performance evaluation of a felt material forming the aforementioned felt member 41. FIG. 9 is an explanatory table showing the results of performance evaluation. FIGS. 10 and 11 are explanatory graphs showing the results of XRD analysis (X-ray diffraction analysis) of samples used for performance evaluation.

(Samples)

As shown in FIG. 9, four samples (samples S1 to S4) of alumina-silica felt material were used for performance evaluation. Samples S1 and S2 correspond to materials having an $Al_2O_3$ crystal structure, whereas samples S3 and S4 correspond to materials not having an $Al_2O_3$ crystal structure. FIG. 10 shows the results of XRD analysis of samples S2 and S4 selected from these samples. Sample S2 exhibited a peak attributed to an $Al_2O_3$ crystal structure at around 33°, but sample S4 did not exhibit such a peak. Although not illustrated, sample S1 exhibited a peak attributed to an $Al_2O_3$ crystal structure as in the case of sample S2, and sample S3 did not exhibit such a peak as in the case of sample S4.

As shown in FIG. 9, samples S1 and S3 were thermally treated at 1,000° C. (10 hours). In contrast, samples S2 and S4 were not subjected to such thermal treatment. As described above, when an alumina-silica felt material is thermally treated at 1,000° C. or higher, amorphous silica (i.e., silica component) contained in the felt material is converted into crystalline silica. Thus, samples S1 and S3 have an $SiO_2$ crystal structure, and samples S2 and S4 do not have an $SiO_2$ crystal structure. FIG. 11 shows the results of XRD analysis of samples S1 and S2 selected from these samples. Sample S1 exhibited a peak attributed to an $SiO_2$ crystal structure at around 22°, but sample S2 did not exhibit such a peak. Although not illustrated, sample S3 exhibited a peak attributed to an $SiO_2$ crystal structure as in the case of sample S1, and sample S4 did not exhibit such a peak as in the case of sample S2.

Each sample was examined for the ratio of the intensity of the peak attributed to an $SiO_2$ crystal structure to the intensity of the peak attributed to an $Al_2O_3$ crystal structure obtained by XRD analysis (hereinafter the ratio may be referred to as the "crystal peak intensity ratio"). In the case where a peak attributed to each crystal structure was absent, the peak intensity was defined as zero. In sample S1, the crystal peak intensity ratio was 0.61. In samples S2 and S4, the crystal peak intensity ratio was zero, since the peak attributed to an $SiO_2$ crystal structure was absent. In sample S3, the crystal peak intensity ratio was infinite, since the peak attributed to an $Al_2O_3$ crystal structure was absent. Thus, the felt material of sample S1 was found to contain crystalline silica formed through the thermal treatment.

(Evaluation Items and Evaluation Methods)

In the present performance evaluation, two items (Si scattering test and durability test) were evaluated. In the S1 scattering test, each sample and the unit cell 110 were disposed in a crucible at a predetermined distance away from each other, and then thermal treatment was performed in a hydrogen atmosphere (humidity: 40%) at 850° C. for 100 hours. Thereafter, XRF analysis (X-ray fluorescence analysis) was performed to thereby quantify the amount of Si (ppm) on the surface of the unit cell 110. Rating "O" (pass) was assigned to a sample exhibiting an amount of Si of less than 100 ppm, whereas rating "X" (fail) was assigned to a sample exhibiting an amount of Si of 100 ppm or more.

The durability test was performed on samples S1 and S4. Specifically, rated electricity generation was performed at 850° C. for 100 hours in the fuel cell stack 100 including the felt member 41 formed of each of these samples (i.e., felt material), and then voltage was measured at 700° C. and a current density of 0.55 A/cm². An increase in η resistance ($\Delta\eta$ ($\Omega$)) was calculated from the difference between the thus-measured voltage and the initial voltage. Rating "O" (pass) was assigned to a sample exhibiting a $\Delta\eta$ of less than 0.1Ω, whereas rating "X" (fail) was assigned to a sample exhibiting a $\Delta\eta$ of 0.1Ω or more. The durability test was followed by D-SIMS analysis (dynamic-secondary ion mass spectrometry analysis), to thereby determine the amount of Si poisoning (ppm) at an electrolyte layer 112-side portion (electrode active portion) of the anode 116.

(Results of Evaluation)

In the Si scattering test, rating "O" (pass) was assigned to sample S1, since the amount of Si was less than 100 ppm (i.e., detection limit or less). The felt material of sample S1 has both an $Al_2O_3$ crystal structure and an $SiO_2$ crystal structure. This probably resulted in suppression of Si scattering. In contrast, rating "X" (fail) was assigned to samples S2, S3, and S4, since the amount of Si was 100 ppm or more. The felt material of sample S2 has an $Al_2O_3$ crystal structure, but does not have an $SiO_2$ crystal structure. This probably resulted in failure to suppress Si scattering. Since the felt material of sample S3 has an $SiO_2$ crystal structure as in the case of sample S1, but does not have an $Al_2O_3$ crystal structure, Si scattering was not suppressed. This is probably attributed to the fact that the felt material having an S102 crystal structure but not having $Al_2O_3$ crystal structure cannot maintain its felt form and exhibits poor thermal resistance, which causes scattering of particulate felt material during the test. The felt material of sample S4 has neither an $Al_2O_3$ crystal structure nor an $SiO_2$ crystal structure. This probably resulted in failure to suppress Si scattering. The aforementioned results of the Si scattering test indicate that Si scattering from the felt member 41 can be reduced when the felt member 41 is formed of a felt material having both an $Al_2O_3$ crystal structure and an $SiO_2$ crystal structure.

In the durability test, rating "O" (pass) was assigned to sample Si, since $\Delta\eta$ was less than 0.1Ω (0.06Ω). In the felt material of sample S1, the amount of Si was small in the Si scattering test. This probably resulted in prevention of poisoning of the unit cell 110 by Si (i.e., contaminant) and suppression of an increase in η resistance (activation polarization in η resistance). In the case of sample S1, the amount of Si poisoning at the anode 116 was as small as 200 ppm. In contrast, rating "X" (fail) was assigned to sample S4, since $\Delta\eta$ was 0.1Ω or more (0.12Ω). In the felt material of sample S4, the amount of Si was large in the Si scattering test. This probably resulted in poisoning of the unit cell 110 by Si (i.e., contaminant) and an increase in η resistance. In the case of sample S4, the amount of Si poisoning at the anode 116 was as large as 850 ppm. The durability test was not performed on sample S2, since sample S2 failed to maintain its form, and the felt member failed to be assembled into the fuel cell stack. The durability test was not performed on sample S3, since the felt material shrank by the thermal treatment.

The aforementioned results of performance evaluation indicate that when the felt member 41 contains a ceramic material (alumina) and a silica component and includes both an $Al_2O_3$ crystal structure and an $SiO_2$ crystal structure, scattering of a contaminant (e.g., Si) from the felt member 41 can be reduced, and impairment of the performance of the unit cell 110, which would otherwise occur due to poisoning caused by a contaminant (e.g., Si), can be prevented. In order to reduce scattering of a contaminant (e.g., Si), the amount of Si contained in the felt material is preferably reduced. However, the felt material containing a small amount of Si may cause problems, including poor handling property and occurrence of breakage or crushing during an assembly process.

B. Modifications

The technique disclosed in the present specification is not limited to the above embodiment, but may be modified into various other forms without departing from the gist thereof. For example, the technique may be modified as described below.

In the above embodiment, the configuration of the fuel cell stack 100 is a mere example, and may be modified into various forms. For example, the position of the felt member 41 in the above embodiment is a mere example, and the felt member 41 may be provided at another position in the fuel cell stack 100.

In the above embodiment, the felt member 41 is formed of an alumina-silica felt material. However, the felt member 41 may be formed of a felt material containing silica and a ceramic material other than alumina. Alternatively, the felt member 41 may be formed of a metal-silica felt material (e.g., nickel felt). Even in such a case, when the felt member 41 contains a ceramic material or a metal and a silica component and includes both a crystal structure corresponding to the ceramic material or the metal (first crystal structure) and an $SiO_2$ crystal structure (second crystal structure), scattering of a contaminant (e.g., Si) from the felt member 41 can be reduced, and impairment of the performance of the unit cell 110, which would otherwise occur due to poisoning caused by a contaminant (e.g., Si), can be prevented.

In the present specification, the "structure in which a member (or a certain portion of the member; the same also applies in the following description) B and a member C face each other with a member A intervening therebetween" is not limited to a structure in which the member A is adjacent to the member B or the member C, but includes a structure in which another component element intervenes between the member A and the member B or between the member A and the member C. For example, another layer may be provided between the electrolyte layer 112 and the cathode 114. This structure can be said to be a structure in which the cathode 114 and the anode 116 face each other with the electrolyte layer 112 intervening therebetween.

In the above embodiment, the fuel cell stack 100 has a structure including a plurality of stacked flat-plate-shaped electricity generation units 102. However, the present invention may be applied to another structure; for example, a structure disclosed in International Patent Publication WO 2012/165409 wherein a plurality of approximately cylindrical fuel cell unit cells are connected in series.

The above embodiment corresponds to an SOFC for generating electricity by utilizing the electrochemical reaction between hydrogen contained in fuel gas and oxygen contained in oxidizer gas; however, the present invention is also applicable to an electrolysis cell unit which is a constitutive unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2016-81813, detailed description thereof is omitted, but schematically, the electrolysis cell stack has a structure similar to that of the fuel cell stack 100 in the above embodiment. That is, the fuel cell stack 100 in the above embodiment may be read as "electrolysis cell stack," the electricity generation unit 102 may be read as "electrolysis cell unit," and the unit cell 110 may be read as "electrolysis unit cell." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the communication hole 108. Consequently, the electrolysis of water occurs in the electrolysis cell units, whereby hydrogen gas is generated in the anode chambers 176, and hydrogen is discharged to the outside of the electrolysis cell stack through the communication hole 108. Even in the electrolysis unit having the aforementioned configuration, the use of the felt member 41 having the aforementioned structure can reduce scattering of a contaminant (e.g., Si) from the felt member 41, to thereby prevent impairment of the performance of the unit cell 110, which would otherwise occur due to poisoning caused by a contaminant (e.g., Si).

The above embodiment is described while referring to the solid oxide fuel cell (SOFC); however, the present invention is also applicable to other types of fuel cell (or electrolysis cell), such as a molten carbonate fuel cell (MCFC).

DESCRIPTION OF REFERENCE NUMERALS

22: bolt; 24: nut; 26: insulation sheet; 27: gas passage member; 28: body portion; 29: branch portion; 41: felt member; 100: fuel cell stack; 102: fuel cell electricity generation unit; 104: end plate; 106: end plate; 108: communication hole; 110: unit cell; 112: electrolyte layer; 114: cathode; 116: anode; 120: separator; 121: hole; 124: bonding portion; 130: cathode-side frame; 131: hole; 132: oxidizer gas supply communication hole; 133: oxidizer gas discharge communication hole; 134: cathode-side current collector; 135: current collector element; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 166: cathode chamber; 171: fuel gas introduction manifold; 172: fuel gas discharge manifold; and 176: anode chamber.

The invention claimed is:

1. An electrochemical reaction unit comprising:
a unit cell including an electrolyte layer, and a cathode and an anode that face each other in a first direction with the electrolyte layer intervening therebetween; and
a felt member containing a ceramic material and a silica component or a metal and a silica component, the electrochemical reaction unit being characterized in that:

the felt member includes both a first crystal structure and a second crystal structure, wherein the second crystal structure is an $SiO_2$ crystal structure, wherein the felt member is disposed in a gas chamber facing a specific electrode, which is at least one of the cathode and the anode, the electrochemical reaction unit further comprising:

a frame member having a hole forming the gas chamber facing the specific electrode; and a current collecting member electrically connected to the specific electrode, wherein:

the felt member is disposed between an outer surface of the current collecting member and a wall surface of the hole of the frame member in a direction orthogonal to the first direction.

2. An electrochemical reaction unit according to claim 1, wherein the felt member is disposed in the gas chamber facing the specific electrode to be located at opposite ends of the gas chamber in a direction orthogonal to a main flow direction of a gas.

3. An electrochemical reaction unit according to claim 1, wherein the felt member contains alumina as the ceramic material.

4. An electrochemical reaction unit according to claim 1, wherein the electrochemical reaction unit is a fuel cell electricity generation unit.

5. An electrochemical reaction cell stack comprising a plurality of electrochemical reaction units disposed in the first direction, the electrochemical reaction cell stack being characterized in that:

at least one of the electrochemical reaction units is an electrochemical reaction unit as recited in claim 1.

* * * * *